3,725,099
WHITE SILICON CARBIDE SOSOLOIDS
Arthur Jack Nozik, Westport, and Samuel Tribit, Hawthorne, N.Y., and Ferd E. Williams, Newark, Del., assignors to American Cyanamid Company, Stamford, Conn.
No Drawing. Filed Dec. 23, 1970, Ser. No. 101,197
Int. Cl. C08h 17/02; C04b 35/14
U.S. Cl. 106—288 B 4 Claims

ABSTRACT OF THE DISCLOSURE

Pigmentary silicon carbide sosoloids of exceptional whiteness are achieved by a solid solution of silicon carbide and from 0.10 to 25% by weight of a compound having an optical band gap in excess of five electron volts, e.g., aluminum nitride and boron phosphide. The sosoloids are prepared by heating a source of silicon intimately admixed with a Group III element with a source of carbon at a temperature above 1350° C. in the presence of hydrogen and a Group V element.

---

This invention relates to the formation of a white finely-divided crystal product for use as a white pigment of high hiding power. The product consists of a sosoloid (solid solution), such as a mixed crystal, of silicon carbide with a second component having a large optical band gap.

It is well known that pigment hiding power (i.e., ability to hide a given surface with a minimum amount of pigment suspended in a vehicle) is principally dependent upon the pigment having a high index of refraction and a sub-microscopic particle size. Silicon carbide has such requisite high index of refraction (2.5 to 2.7) comparable to the two principal white titanium dioxide pigments, anatase and rutile. However, heretofore it has not been possible to prepare pure white silicon carbide in the desired colloidal particle size to render it satisfactory as a white pigment. The usual silicon carbide of commerce is not of colloidal size and is too dark in color to be satisfactory for this purpose.

Colloidal silicon carbide of suitable hiding power has been reported in U.S. Pat. No. 3,236,673. It has been prepared by heating an intimate mixture of pulverized silicon containing material with an excess of carbonaceous material to a temperature of above 1350° C. and below 1750° C. in an inert gas. By properly controlling the particle size of the starting material and other parameters, pigmentary silicon carbide of average particle diameter sizes from 100 to 1000 millimicrons was reported produced using a fluidized bed technique for effecting the reaction. The product, in experimental quantities was described to be comparable to titanium dioxide pigment reflecting 80% of the light with no more than a 20% variation over the entire visible spectrum. For such a product, it is said to be important that the silicon carbide have the proper electronic configuration in which, for example, minor impurities of the third column of the periodic table are compensated by impurities of the fifth column of the periodic table.

However, silicon carbide has two polymorphic crystal structures: cubic; and, hexagonal. ["Silicon Caride, a High Temperature Semiconductor," edited by J. R. O'Connor and J. Smiltens (Pergamon Press, Inc., New York, 1960) and W. F. Knippenberg, Philips Res. Repts. 18, 161–274 (1963).] The optical band gap of the cubic form is 2.39 ev. Hence pure, intrinsic cubic silicon carbide is yellow in color. Unfortunately the colloidal silicon carbide, even with the proper electronic compensation of U.S. Pat. 3,236,673, produced at a reaction temperature of from above 1350° C. to below 1750° C., is of cubic crystal structure meaning that the product realized therefrom is colored and not sufficiently white for applications requiring a white pigment.

It is an object of this invention to provide a white silicon carbide pigment of excellent hiding power.

The present invention overcomes the foregoing and related disadvantages of known pigmentary silicon carbide and meets the object of this invention by providing a white crystal product comprising a solid solution in silicon carbide of a second compound present in amounts ranging from 0.10 to 25% by weight, said compound having an optical band gap in excess of five electron volts.

In its preferred form the product utilizes aluminum nitride as the second compound.

This invention also relates to the making of white, pigmentary silicon carbide reacting carbon with a silicon containing material intimately admixed with a second component of the class consisting of a Group III element, compounds thereof and mixtures thereof, at a temperature of about 1350° C., conducting said reaction in an atmosphere containing a Group V element whereby from 1.10 to 25% by weight of a second compound of Group III and Group V elements forms a sosoloid with silicon carbide.

As defined herein the white or whiteness of the sosoloid silicon carbide of this invention is comparable to the whiteness of titanium dioxide pigment of high quality. Titanium dioxide of high quality has a total integrated reflectance of incident visible light of greater than 85%. Sosoloid silicon carbide includes mixed crystals in which at least 2 isomorphous solids are in solution. If the silicon carbide and the second component are both of the same crystal class, and a homogeneous, one-phase solid product results from their interaction, then the product is defined as a mixed crystal. The lattice parameters of such a mixed crystal are within the limits determined by the two individual starting materials. If the silicon carbide and the second component are of different crystal classes, and a homogeneous, one-phase solid product results from their interaction, then the product is simply a sosoloid. The behavior of the lattice parameter of the sosoloid need not be systematic.

As earlier noted, pure, intrinsic cubic silicon carbide has an optical band gap width of 2.30 ev. Silicon carbide in hexagonal structure contains a whole class of substructures, called polytypes, but most hexagonal polytype have a band gap greater than 3.0 ev. Therefore, most polytypes of pure, intrinsic, hexagonal silicon carbide should appear white in powdered form. However, such whiteness is not seen. This is because of the adverse effect of very small amounts of impurities on the optical properties of the silicon carbide. These impurities effectively decrease the optical band gap, produce additional absorption bands in the visible spectrum, and introduce a free carrier absorption tail in the red region of the spectrum. The resultant colors of such silicon carbides can vary from green (10–100 p.p.m. of nitrogen), to blue (100 p.p.m. aluminum) to black (1000–10,000 p.p.m. of aluminum, nitrogen, etc.).

The elimination of the small level of impurities (10–100 p.p.m.) sufficient to produce significant color in hexagonal silicon carbide is very difficult and has not been achieved. However, in this invention these undesirable optical effects of impurities can be eliminated in silicon carbide by forming a sosoloid of silicon carbide with a second component having a sufficiently large optical band gap, i.e., the resultant optical band gap of the sosoloid is greater than 3.0 ev.

A white product can thus be obtained with either cubic or hexagonal silicon carbide as the major component. It is only necessary to judiciously select the type and amount of the second component.

The required nature and amount of the second component used to make a white crystal depends upon both the electronic band structure of the second component and the silicon carbide. The final product must have a band gap greater than 3.0 ev. The second component essential for whiteness should have a useful optical band gap in excess of 5.0 ev. so that in amounts of from 0.10 to 25 weight percent, the sosoloid band gap is greater than 3.0 ev. The amount of the second component added is in turn limited by the requirement that hiding power of the pigmentary sosoloid not be deleteriously affected i.e., the refractive index should approximate the 2.5 to 2.7 value of silicon carbide.

Suitable second components can be derived from a combination of Group III–A—aluminum, boron, gallium, indium and thallium—and Group V—nitrogen, phosphorous, arsenic, antimony and bismuth—elements. Representative of these second components and preferred for whiteness, are aluminum nitride, boron nitride and boron phosphide. The complexity of defining optical band gaps in each crystallographic direction and relating their influence on the change of optical band width of the silicon carbide requires considerable caution and care in selecting the useful combinations.

In the process of the present invention, a source of silicon, such as quartz, sand, silicic acid, silica gel, colloidal or amorphous silica (silica sol), as well as elemental silicon, etc., is reacted at elevated temperatures with pure carbon. The carbon may be obtained, for example, from methane or other hydrocarbons, petroleum coke, charcoal, etc. The temperature of the reaction is maintained within the range of about 1350° C. to about 2500° C., and preferably between 1400–1600° C. for the cubic phase and between 2200–2400° C. for the hexagonal phase. The reaction must be carried out in a hydrogen containing atmosphere to facilitate sosoloidation of the components.

The second component is introduced in the sosoloid product by intimately admixing, preferably on an atomic scale, the source of the Group III–A element with the source of silicon, e.g., aluminum doped silica, and admixing the source of the Group V element in the reaction atmosphere, e.g., a nitrogen-hydrogen mixture. Amounts of each element to form the second component are provided to yield from 0.10 to 25 weight percent.

The white pigmentary silicon carbide of this invention may then be intimately dispersed in well-known vehicles, such as solutions or dispersions of linseed oil, alkyd resins, latex, etc., to produce white paint.

The following examples illustrate the preferred mode of carrying out the invention and the novel product obtained.

EXAMPLE 1

Silicon dioxide containing 0.1% aluminum as an impurity was intimately mixed with an amount of pure carbon powder sufficient to stoichiometrically form silicon carbide. The reactants were placed into a graphite boat which was inserted into a tube furnace outfitted with a mullite tube. Hydrogen gas, containing 0.12% $N_2$, was passed over the reactants while they were heated at 1400° C. for 6 hours. After this period, the product was oxidized in flowing $O_2$ at 900° C. to remove unreacted carbon, and thereafter treated at 90° C. with hot HF solution to remove unreacted $SiO_2$. The final product was a white powder with excellent whiteness and hiding power. Its crystal structure was cubic and it contained 1% aluminum in the form of a solid solution of aluminum nitride and cubic silicon carbide.

EXAMPLE 2

A tube of impure silica (containing about 0.1% by weight of aluminum) was heated at a temperature of about 1400° C. while a stream of hydrogen containing methyl trichlorosilane and nitrogen was passed through it. After 5 hours the reaction was terminated and a white powder recovered from the interior tube surface. The white powder ranged in particle size from 0.5 to 5μ; consisted of sosoloid cubic crystals of 99% silicon carbide and 1% aluminum nitride; and, had a total reflectance of about 85%.

EXAMPLE 3

The procedure of Example 1 is followed except that the silicon dioxide contains 10% boron. The sosoloid product is of useful whiteness, pigmentary size, and composed of about 90% silicon carbide and 10% boron nitride.

EXAMPLE 4

To obtain a white sosoloid pigment of 90% silicon carbide and 10% boron phosphide the procedure of Example 3 is to be followed except that hydrogen gas contains about 1% by weight phosphorous.

EXAMPLE 5

For the hexagonal crystal form of the sosoloid product, one need only raise the temperature of Example 1 to the range of 2200° C. to 2400° C.

We claim:
1. A white crystalline pigmentary product having a refractive index of from 2.5 to 2.7 consisting essentially of a solid solution of silicon carbide and a second component selected from the compounds of the combination of Group III–A and Group V elements, said second component present in amounts of from 1 to 10 weight percent based on said product and having a optical band gap in excess of 5.0 electron volts.
2. Product of claim 1 wherein said second compound is aluminum nitride.
3. Product of claim 1 wherein said second compound is boron nitride.
4. Product of claim 1 wherein said second compound is boron phosphide.

References Cited

UNITED STATES PATENTS

| 3,236,673 | 2/1966 | O'Connor et al. | 106—288 B |
| 3,259,509 | 7/1966 | Matkovich et al. | 106—44 |

OTHER REFERENCES

Lye, R.G.; Optical Properties And Band Structure of Titanium Carbide, in Phys. Rev., 147(2), July 1966, pp. 622–35.

L. DEWAYNE RUTLEDGE, Primary Examiner
W. R. SATTERFIELD, Assistant Examiner

U.S. Cl. X.R.
106—44; 264—82